United States Patent [19]

Hammond et al.

[11] 4,194,981

[45] Mar. 25, 1980

[54] POLYURETHANE OF NEOPENTYL GLYCOL-PHOSPHOSULFURIZED POLYOLEFIN AND LUBRICANT CONTAINING SAME

[75] Inventors: Kenneth G. Hammond, Poughkeepsie; Raymond C. Schlicht, Fishkill, both of N.Y.

[73] Assignee: Texaco Inc., White Plains, N.Y.

[21] Appl. No.: 973,838

[22] Filed: Dec. 28, 1978

[51] Int. Cl.$^2$ ............... C10M 1/44; C08K 5/01; C08G 18/62; C08K 5/10
[52] U.S. Cl. ............... 252/46.7; 260/31.2 N; 260/33.2 R; 260/33.6 UB; 528/72
[58] Field of Search ............... 528/72; 252/46.7; 260/31.2 N, 33.2 R, 33.6 UB

[56] References Cited

U.S. PATENT DOCUMENTS

| | | | |
|---|---|---|---|
| 3,281,359 | 10/1966 | Oberender et al. | 252/48.6 |
| 3,317,426 | 5/1967 | Lowe | 252/46.7 |
| 3,573,205 | 3/1971 | Lowe et al. | 252/51.5 A |
| 3,644,595 | 2/1972 | Wu | 528/72 |
| 3,660,539 | 5/1972 | Wu | 528/72 |
| 3,662,038 | 5/1972 | Wu | 528/72 |
| 3,850,826 | 11/1974 | de Vries | 252/51.5 A |

Primary Examiner—H. S. Cockeram
Attorney, Agent, or Firm—Robert A. Kulason; Carl G. Ries; James F. Young

[57] ABSTRACT

A polyurethane polymer which is the reaction product of a diisocyanate and a particular polyol adduct is described. The polyurethane polymer is a low molecular weight polyurethane polymer particularly useful as a dispersant in lubricating oils. Disclosed herein is an improvement in the dispersancy of certain polyol lubricant dispersants by conversion of the polyol into a polyurethane.

27 Claims, No Drawings

POLYURETHANE OF NEOPENTYL GLYCOL-PHOSPHOSULFURIZED POLYOLEFIN AND LUBRICANT CONTAINING SAME

BACKGROUND OF THE INVENTION

1. Field of the Invention

This invention relates to a novel polyurethane polymer, especially a low molecular weight polyurethane polymer, which is the reaction product of a diisocyanate and a particular polyol adduct. This invention is concerned with lubricating oil compositions containing the novel polyurethane polymer as a dispersant therein. More especially, this invention is directed to improving the dispersancy of neopentyl polyol derivatives in lubricating oil compositions.

2. Discussion of the Prior Art

In U.S. Pat. No. 3,281,359 to Oberender et al, the disclosure of which is hereby specifically incorporated herein by reference, there are disclosed new neopentyl polyol derivatives useful as detergent/dispersants in lubricating oils, particularly petroleum lubricating oils. These neopentyl polyols are formed by a particular sequence of steps involving the initial formation of a polyolefin-$P_2S_5$ reaction product. That reaction product is thereafter treated with steam at temperatures, say, of 100° to 260° C. to form inorganic phosphorus acids which are removed. The product is also treated with methanol to effect extraction of undesired components to leave a hydrolyzed polyolefin-$P_2S_5$ reaction product which is substantially free of inorganic phosphorus acid. That product is thereafter treated with a neopentyl polyol of the formula

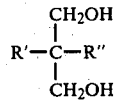

wherein R' and R" are members from the group consisting of alkyl and alkylol of from 1 to 20 carbon atoms at temperatures between about 180° and 220° C. in a mole ratio of neopentyl polyol to hydrolyzed reaction product of between about 0.33:1 and 2:1. The resultant product is believed to be primarily a complex mixture of hydrocarbon phosphorus acid monoesters, diesters, polyesters, cyclic esters and anhydrides. The hydroxyl number of the resultant product is usually within the range of 5 to 350, preferably 20 to 80. This product is an effective detergent/dispersant for lubricating oils, both of the hydrocarbon mineral oil type and the synthetic hydrocarbon, ester, or ether type.

It has become desirable, however, to improve the dispersant properties of this neopentyl polyol derivative so that the same is rendered more efficient in reducing the formation of deposits in gasoline and in diesel engine applications. It has become desirable, therefore, to provide an improved lubricating oil composition having as a detergent/dispersant a neopentyl polyol derivative-based composition of improved dispersancy.

SUMMARY OF THE INVENTION

In accordance with the above-stated desideratum, there is provided in accordance with this invention a polyurethane polymer, useful as a dispersant in a lubricating oil, which is the reaction product of a diisocyanate of the formula

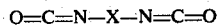

wherein X is a divalent organo moiety and a polyol, said polyol prepared by the steps comprising:

A. contacting a polyolefin with $P_2S_5$;
B. contacting the resultant polyolefin-$P_2S_5$ reaction product with steam;
C. removing inorganic phosphorus acid from the steam treated polyolefin-$P_2S_5$ reaction product;
D. contacting the inorganic acid free steam hydrolyzed polyolefin-$P_2S_5$ reaction product with a polyol of the formula

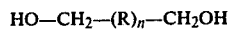

wherein
n=0 or 1 and
R is a saturated or unsaturated substituted or unsubstituted alkylene group of 1 to 12 carbon atoms, preferably 1 to 8 carbon atoms.

The polyol can be a diol or a compound possessing three or more hydroxyl groups. When substituted, the polyol can be substituted by a hydroxyl group or a group inert to an isocyanate, which includes hydrocarbyl groups such as alkyl groups, e.g., alkyl groups of 1 to 20 carbon atoms. Other groups which can be substituents on the R function include ether groups, e.g., where the ether oxygen is part of the chain, tertiary amino groups, carboxylic acid ester groups, especially $C_{1-4}$ alkyl ester groups, nitrile groups, nitroso groups, amido groups, sulfonyl ester groups, e.g., $C_{1-4}$ alkyl sulfonyl ester groups and the like.

Hence, the polyol is a triol where R is substituted by hydroxyl. The polyol can also be ethylene glycol. Other polyols which can be employed include propylene glycols, butanediols, e.g., 1,3- and 1,4-butanediol, 1,5-, 1,3- and 1,4-pentanediol, pinaccle. Preferably the polyol is an acyclic polyol.

In accordance with a preferred mode of the invention, there is employed for reaction with the polyolefin-$P_2S_5$ reaction product a neopentyl polyol of the formula

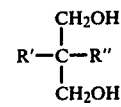

wherein R' and R" are selected from the group consisting of alkylol and alkyl of from 1 to 20 carbon atoms.

The polyurethane polymers of the present invention are generally low molecular weight polyurethane polymers in the range of 2,500 to 15,000, preferably 2,500 to 8,000, the molecular weight being determined by vapor pressure osmometry. Generally speaking, there are between 1 and 8 diisocyanate units incorporated into the polyurethane polymer, preferably 1 to 3 diisocyanate units are incorporated. Owing to the nature of the polyol itself which, as stated above, is believed to be a mixture of phosphoric acid monoesters, diesters, polyesters, cyclic esters and anhydrides containing hydroxyl groups, a formula cannot be set forth pictorially representing the recurring unit of the novel polyurethane polymer.

The polyurethane polymer is obtained by reaction of the polyol derivative with a diisocyanate. A wide variety of diisocyanates is useful in accordance with the present invention inasmuch as the improved dispersancy of the polyol derivative is due to the fact that the same has been slightly polymerized and the hydroxyl groups have been converted to urethane groups. The diisocyanates useful in accordance with the invention are those having the formula

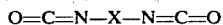

O=C=N—X—N=C=O wherein X represents a divalent organo moiety. X can represent both aliphatic and aromatic divalent groups. Of the aromatic isocyanates, there are particularly contemplated those isocyanates where X is arylene, polyarylene or O—, S— and —N— linked arylene groups, or mixed arylene-alkylene chains. Preferably, the aryl groups of the arylene or polyarylene groups each contain 6 to 14 carbon atoms in the ring, while the alkylene groups contain 1 to 20 carbon atoms in the chain.

Where X represents an alkylene group, the same can be an alkylene group of 2 to 20 carbon atoms. The moiety X can also represent polyoxalkylene, such as α-ω-bis-isocyanatoalkyl polyalkylene ethers. Thioanalogs of the aforementioned diisocyanates can also be employed. The moiety X can represent other aliphatic moieties other than alkylene groups which can contain oxygen, sulfur, or nitrogen in the chain as well as unsaturation. Inert substituents can also be pendant from the aliphatic chain joining the isocyanate groups. Particularly contemplated isocyanates useful in the preparation of the polyurethane according to the invention include phenylene diisocyanate, tolylene diisocyanate, methylene diphenyldiisocyanate, hexamethylene diisocyanate, and polymeric isocyanates such as polymeric methylene diphenyldiisocyanates. In general, the organic isocyanate reactant can be an aryl, alkyl, or alkaryl diisocyanate characterized by molecular weight below about 400. Particularly contemplated commercial diisocyanates include the tolylene diisocyanate, methylene diphenyldiisocyanate, polymeric type methylene diphenyldiisocyanate, the aforementioned hexamethylene diisocyanate and polyethyleneglycol diisocyanate.

The polymerization reaction is carried out at a temperature of 0° to 200° C., preferably 50° to 80° C. Sufficient heat is generally applied to the reaction mixture so that the same can be easily stirred.

The polymerization reaction can be effected at a pressure of from 5 Torr to 5 atmospheres, with atmospheric pressure being preferred.

The mole ratio of the diisocyanate reactant to the polyol derivative depends upon the number of isocyanate groups on the isocyanate reactant as well as the number of hydroxyl groups in the polyol derivative. Generally speaking, the mole ratio of isocyanate groups to hydroxyl groups in the polyol derivative reactant is 0.1 to 0.9:1, preferably 0.25 to 0.75:1.

The polymerization reaction can take place with or without the use of a catalyst. If a catalyst is employed, it is preferred that the same be a basic catalyst. Particularly contemplated basic catalysts include tertiary amine catalysts. Triethylamine and pyridine are exceptionally suitable catalysts for reaction of the polyol with a diisocyanate. When a catalyst is present, the same is present in a catalytic amount, generally between 0.1 and 1.0 weight percent.

The polymerization reaction is effected until the desired product is obtained, i.e., a product of molecular weight of 2,500–15,000. Generally speaking, the polymerization is effected for a period of between 0.5 and 6.0 hours, preferably 2.0 and 3.0 hours.

The polymerization can be effected with or without the presence of a solvent. If it is desired to employ a solvent, it is preferred that the solvent be a component of a lubricating oil composition, in which case a concentrate is obtained which can simply be diluted by the addition of additional quantities of lubricating oil component. For instance, the solvent can be a hydrocarbon mineral oil which can be paraffin base, naphthene base, or mixed paraffin base distillate or residual oil. Similarly, solvent diluent can be a synthetic lubricating oil base of the hydrocarbon, ester, or ether type, such as disclosed in U.S. Pat. Nos. 3,907,922, 2,723,286, and 3,184,430 respectively.

When the process is complete, any catalyst which may have been used is removed. Catalyst removal can be effected by heating the reaction mass and/or subjecting it to reduced pressure, or both, until such time as substantially all of the catalyst is removed.

The resultant polymer has excellent detergent/dispersancy characteristics in lubricating oil compositions, as will be seen from the data below. It is highly soluble in mineral oil, having a solubility in mineral oil at standard temperature and pressure of at least 75 weight percent, preferably at least 95 weight percent.

The polyol derivative reactants employed to form the novel polyurethanes can be prepared as follows:

A polyolefin-$P_2S_5$ reaction product is first prepared. The polyolefinic hydrocarbon reactant usually contains at least 12 carbon atoms, although lower molecular weight olefins can be employed. Aliphatic hydrocarbon monoolefinic polymers, such as polyethylene, polypropylene, polyisopropylene, polyisobutylene, polybutene and copolymers of monoolefins, such as propylene-isobutylene copolymers are examples of the monoolefinic polymers contemplated herein. In general, monoolefinic polymers and copolymers having an average molecular weight of between 250 and 50,000 are employed, with polymers and copolymers having an average molecular weight in the range of 600 to 5,000 being particularly preferred. Copolymers of conjugated dienes and monoolefins, such as a copolymer of butadiene and isobutylene having an average molecular weight in the above-described ranges, are also contemplated. Particularly preferred olefin polymers are the monoolefinic polyisobutylene polymers having an average molecular weight between 600 and 5,000.

The polyolefin is treated with $P_2S_5$ (about 5–40 weight percent of the reaction mass) at a temperature from about 100° to about 320° C. in the presence of between about 0.1 and 5.0 weight percent sulfur. This reaction is normally conducted for a period of between about 1 and 10 hours. The reaction mixture, if not in the liquid state, is placed in the liquid state under preferred conditions. The liquefaction can be accomplished by diluting the reaction mixture with a mineral lubricating oil having an SUS viscosity at 100° F. of between about 50 and 1,000. The lubricating oil, when employed, constitutes between about 25 and 75 weight percent of the diluted reaction product concentrate.

The mineral oil-diluted or undiluted polyolefinic-$P_2S_5$ reaction product is then hydrolyzed by contact with steam at a temperature desirably between about 100° and 260° C. Under advantageous conditions, at least about 1 mole of steam is employed per mole of reaction product and the hydrolysis is conducted for a period of 1 to 20 hours. Inorganic phosphorus acids are formed during the hydrolysis and are removed by standard procedures. A number of different procedures are available for removal of the inorganic phosphorus acids, including those described in U.S. Pat. No. 2,951,835 and U.S. Pat. No. 2,987,512, the disclosures of which are hereby incorporated herein by reference. Particularly contemplated method for removal is disclosed in U.S. Pat. No. 3,135,729, whereby the inorganic phosphorus acids are removed from the hydrolyzed product by first drying the hydrolyzed product by passing an inert gas, such as nitrogen, therethrough at between about 120° and 200° C. and then contacting the inorganic acids with anhydrous methanol under mixing conditions at a temperature between about 40° and 80° C. in a methanol amount of between about 30 and 80 volume percent, based on the overall mixture, to thereby form an extract phase containing inorganic phosphorus acid and a mineral oil raffinate phase containing inorganic phosphorus-acid free, steam hydrolyzed $P_2S_5$-polyolefin reaction product. During the extraction procedure, superatmospheric pressure can be applied, up to about 50 psig, in order to maintain the methanol in the liquid state. At the end of the extraction, any methanol carried over into the raffinate phase is preferably removed, such as by stripping the raffinate with an inert gas at an elevated temperature.

The inorganic phosphorus acid-free, hydrolyzed polyolefin-$P_2S_5$ reaction product is then contacted with the polyol above-identified and preferably a neopentyl polyol of the formula

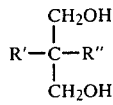

where R' and R" are members selected from the group consisting of alkyl and alkylol of from 1 to 20 carbon atoms at a temperature between about 180° and 220° C. in a mole ratio of polyol to hydrolyzed reaction product of between about 0.33:1 and 2:1. This reaction is normally conducted for a period of 1 to 10 hours. The resulting product is believed to be primarily a complex mixture of hydrocarbon phosphorus acid monoesters, diesters, polyesters, cyclic esters and anhydrides.

Under preferred conditions, the esterification reaction is continued until the total acid number (TAN) of the reaction mixture falls below about 5. To obtain this TAN level normally the removal of between about 1.0 and 1.4 moles of water by-product per mole of hydrolyzed $P_2S_5$-polyolefin reaction product is required. Method of determining TAN values is described in ASTM test D 664-54.

Further, under preferred conditions a liquid agent is present which forms an azeotrope with water to facilitate continuous water by-product removal during the neopentyl polyol esterification reaction. It is normally present in a volume amount of between about 5 and 40 percent. Specific examples of azeotroping agents contemplated herein are xylene, benzene, toluene and isooctane and any other inert liquid hydrocarbon which forms an azeotrope with water that distills during the esterification reaction.

Specific examples of the neopentyl polyol reactants contemplated herein are pentaerythritol, trimethylolpropane, trimethylolethane, trimethylolbutane, dipentaerythritol, neopentylglycol, 2-methyl-2-ethyl-1,3-propanediol, 2,2-dodecyl-1,3-propanediol and 5,5-dimethylolhexanol. If desired, the neopentyl derivative before or after contact with the diisocyanate can have its odor reduced for better consumer acceptance. One mode for reducing the odor is to contact the same with nitrogen dioxide or a mixture of nitrogen dioxide and oxygen alternatively diluted with an inert gas such as nitrogen. The gas is bubbled through the neopentyl polyol derivative or corresponding polyurethane at a temperature between about 65° and 150° C. until at least about 0.15 weight percent nitrogen dioxide, and preferably less than about 0.22 weight percent nitrogen dioxide, is absorbed by the polyol or corresponding polyurethane. Under advantageous conditions, nitrogen dioxide is diluted with air or an inert gas such as nitrogen, carbon dioxide and the like containing about 1 volume percent or more of nitrogen dioxide.

In the lubricating oil compositions containing the polyurethane detergent/dispersant of the invention, hydrocarbon mineral oil can be employed as the base material including oils of a paraffin base, naphthene base or mixed paraffin base distillate. Residual oils can also be present in the lubricating oil compositions of this invention. Paraffin base distillate lubricating oil fractions, as used in premium grade motor oils, are also contemplated for use in lubricating oil compositions of the invention. The lubricating mineral oil base generally is one which has been subjected to solvent refining to improve its lubricity and viscosity-temperature relationship. Such treatment can include solvent dewaxing to remove waxy components and to improve the pour of the oil. Broadly speaking, mineral lubricating oils for use in the mineral lubricating oil composition of the present invention have an SUS viscosity at 100° F. between about 50 and 1,000. They preferably have a viscosity falling in the range of 70 to 300 at 100° F.

Synthetic lubricating bases of the hydrocarbon, ester or ether type can also be used as a lubricating base oil. High molecular weight, high boiling liquids of these types possess excellent viscosity-temperature relationships and lubricating properties and are finding greater utilization in lubricating oils adapted for high and low temperature applications.

The polyurethane polymers of this invention are present in lubricating oils in concentrations sufficient to impart detergent-dispersant properties thereto. In concentrations used in the formulation of finished lubricant, the concentration of the polyurethane can be as high as 90 percent. In finished lubricants, the concentration of the polyurethane falls between about 0.2 and 10 weight percent with a concentration of between 1 and 5 weight percent normally employed.

The mineral lubricating oils containing the derivatives of the invention usually contain other additives designed to impart other desirable properties thereto. These additives may be any of the suitable standard pour depressants, viscosity index improvers, oxidation and corrosion inhibitors, anti-foamants, supplementary detergent-dispersants, etc. Exactly what additional additives are included in the finished oils and the particular amounts thereof will depend on the particular use and conditions desired for the finished oil product.

Specific examples of the supplementary additives are as follows:

A widely used and suitable VI improver is the polymethacrylate having the general formula:

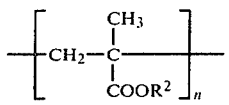

wherein
R[2] is an aliphatic radical of from 1 to 20 carbon atoms and
n is an integer of between about 600 and 35,000.

One of the most suitable VI improvers is the tetrapolymer of butyl methacrylate, dodecyl methacrylate, octadecyl methacrylate and dimethylaminoethyl methacrylate having a respective component weight ratio in the polymer of about 4:10:5:1. Copolymers of ethylene and propylene of 20,000 to 50,000 molecular weight are also commonly used as VI improvers. The VI improvers are normally employed in the finished lubricant compositions in quantities between about 0 and 10 weight percent.

One of the commonly employed lube oil corrosion inhibitors are antioxidants of the divalent dialkyl dithiophosphates resulting from the neutralization of a $P_2S_5$-alcohol reaction product with a divalent metal or divalent metal oxide. Barium and zinc and dialkyl dithiophosphates are specific examples. Another class of antioxidants are the polyalkylated diphenylamines such as a mixture of 2,2'-diethyl-4,4'-dioctylphenylamine and 2,2'-diethyl-4-p-octyldiphenylamine. The corrosion and oxidation inhibitors are usually present in the finished lubricating oil composition in concentrations of between about 0.1 and 3 weight percent.

Examples of supplementary detergent-dispersants which can be employed are the monoethoxylated inorganic phosphorus acid free, steam hydrolyzed polyalkylene (500–50,000 m.w.)-$P_2S_5$ reaction product, alkaline earth metal alkylphenolates such as barium nonylphenolate, barium dodecylcresolate, calcium dodecylphenolate and the calcium carbonate over-based calcium alkaryl sulfonates formed by blowing a mixture of calcium hydroxide and calcium alkaryl sulfonate, e.g., calcium alkylbenzene sulfonate of about 900 m.w. with carbon dioxide to form a product having a total base number (TBN) of 50 or more, e.g., 300 to 400.

If antifoamants are employed in the finished compositions, one widely used class which is suitable are the dimethyl silicone polymers employed in amounts of between about 10 and 1,000 ppm.

In order to more fully illustrate the nature of the invention and the manner of practicing the same, the following examples are presented:

EXAMPLES

EXAMPLE 1

A sample of a pentaerythritol ester of a hydrolyzed phosphosulfurized polyisobutene prepared by the procedure described above from a polyisobutene of about 1300 molecular weight was employed. The sample comprised about 41 weight percent of the pentaerythritol ester and 59 weight percent diluent oil. 300 grams of the sample were used having approximately 0.155 moles of hydroxyl groups based upon the hydroxyl number. The sample was charged to a flask and stirred at 60° to 70° C. Tolylene diisocyanate comprising 80 percent of the 2,4-isomer and 20 percent of the 2,6-isomer was added in an amount of 3.4 grams corresponding to 0.039 mole isocyanate group. The tolylene diisocyanate was added dropwise over a period of 15 minutes and the reaction mixture was stirred for an additional 3 hours. Infrared analysis of the mixture indicated that it contained urethane functionality (carbonyl: 1730 cm$^{-1}$) and that all of the isocyanate had been consumed. The product was used without purification.

EXAMPLE 2

In a manner similar to Example 1, tolylene diisocyanate (17.0 grams, 0.20 mole of isocyanate group) was reacted with another sample of the same pentaerythritol ester of hydrolyzed phosphosulfurized polyisobutene (1500 grams, 0.78 mole of hydroxyl group). The reaction was carried out at 60° to 70° C. for 2.25 hours.

EXAMPLE 3

In a manner similar to Example 1, tolylene diisocyanate (6.8 grams, 0.078 mole of isocyanate group) was reacted with another sample of the same pentaerythritol ester of hydrolyzed phosphosulfurized polyisobutene (300 grams, 0.155 mole of hydroxyl group). The reaction was carried out at 60°–70° C. for 2.25 hours.

EXAMPLE 4

A sample of the pentaerythritol ester of a hydrolyzed phosphosulfurized polyisobutene described in Example 1 (1500 grams, 0.78 mole of hydroxyl group) was charged to a flask and heated and stirred at 60°–70° C. Tolylene diisocyanate (34.0 grams, 0.39 mole of isocyanate group) was added to the flask dropwise over a one-hour period and the resulting mixture was heated at 60°–70° C. for 3 hours. The temperature was raised to 100° C. and the reaction was continued for an additional hour in order to complete the formation of the product.

EXAMPLE 5

Another sample of the pentaerythritol ester of a hydrolyzed phosphosulfurized polyisobutene described in Example 1 (150 grams, 0.078 mole of hydroxyl group) and 1.0 ml of pyridine were charged to a flask and heated to 60°–70° C. Tolylene diisocyanate (4.1 grams, 0.047 mole of isocyanate group) was added dropwise over a 15 minute period and the resulting solution was heated at 60°–70° C. for 2 hours and then at 100° C. for 2.5 hours. The reaction mixture was then stripped at 100° C. (20 mm) for one hour to remove the amine catalyst.

EXAMPLE 6

Example 5 was repeated except that instead of employing 4.1 grams of tolylene diisocyanate, 5.0 grams of the same were employed.

EXAMPLE 7

Example 1 was repeated except that hexamethylenediisocyanate was used in place of tolylene diisocyanate. The mole ratio of isocyanate groups derived from the hexamethylenediisocyanate to hydroxyl groups in the pentaerythritol derivative was 0.50. The polymerization/condensation was effected at 60°–70° C. over a 3.5 hour period.

EXAMPLE 8

A sample of the same pentaerythritol ester of hydrolyzed phosphosulfurized polybutene employed in accordance with Example 1 was charged to a flask and stirred at 60° to 70° C. A polymeric methylene diphenyldiisocyanate (Mondur MRS, Mobay Chemical Company; isocyanate content 7.49 meq./gr.) was added in an amount of 10.1 grams corresponding to 0.077 mole isocyanate functional group. The same was added dropwise over a period of 30 minutes and the resultant solution was stirred for an additional two hours. The mixture was cooled, diluted with heptane and subsequently filtered through a filter aid. The heptane was removed on a flask evaporator and the product blended for bench testing.

COMPARATIVE EXAMPLE 1

The procedure of Example 1 was repeated except that instead of employing tolylene diisocyanate, a monoisocyanate, phenylisocyanate, was employed.

The respective products of Examples 1 through 8 and Comparative Example 1 and the initial pentaerythritol ester from which these products were derived were evaluated to determine their dispersancy in a mineral lubricating oil composition. The Bench VC Test was employed for this purpose. The Bench VC Test is conducted by heating the test oil mixed with a synthetic hydrocarbon blowby and a diluent oil at a fixed temperature for a fixed time period. After heating, the turbidity of the resultant mixture is measured. A low percent turbidity (0–10) is indicative of good dispersancy, while high results (20 to 100) are indicative of oils increasingly poor in dispersancy.

The Bench VC Tests were conducted employing a mineral oil based formulation which contained, besides the experimental dispersant, a zinc dialkyldithiophosphate oxidation, corrosion and wear inhibitor, a polyalkylated diphenyl amine antioxidant, an ethylene-propylene copolymer viscosity index improver, a rust inhibitor, a pour depressant, an overbased calcium sulfonate detergent and an antifoamant. The results of the Bench VC Test are set forth in Table 1 below.

polyurethane obtained by reaction of hexamethylene diisocyanate and the pentaerythritol ester of hydrolyzed phosphosulfurized polybutene.

| GLOSSARY | |
|---|---|
| TDI | Tolylene diisocyanate-mixed isomers; 80 percent 2,4-isomer, 20 percent 2,6-isomer |
| MDI | Methylenediphenyl diisocyante |
| HMDI | Hexamethylene diisocyanate |

What is claimed is:

1. A polyurethane polymer, useful as a dispersant in lube oil, which is the reaction product of a diisocyanate of the formula $$O=C=N-X-N=C=O$$

wherein X is a divalent organo moiety and a polyol, said polyol prepared by
  A. contacting a polyolefin with $P_2S_5$;
  B. contacting the resultant polyolefin-$P_2S_5$ reaction product with steam;
  C. removing inorganic phosphorus acid from the steam treated polyolefin-$P_2S_5$ reaction product;
  D. contacting the inorganic acid free steam hydrolyzed polyolefin-$P_2S_5$ reaction product with a polyol of the formula $$HO-CH_2-(R)_n-CH_2OH$$

wherein
  n=0 or 1 and
  R is a saturated or unsaturated substituted or unsubstituted alkylene group of 1 to 12 carbon atoms.

2. A polyurethane polymer according to claim 1 having a molecular weight of between 2,500 and 15,000.

| Dispersant | Isocyanate | Mole Ratio: Mole NCO Mole OH | Reaction Cond. Temp./Time (°C.) (Hr.) | Product Analysis | | | Bench VC Test[1] | |
|---|---|---|---|---|---|---|---|---|
| | | | | % N | % P | OH No. | 6.0% | 4.0% |
| Example 1 | TDI | 0.25 | 60–70°/3.25 | 0.17 | | 20 | 3.5 | 8.0 |
| | | | | | | | 3.5 | 8.5 |
| Example 2 | TDI | 0.25 | 60–70°/2.25 | 0.19 | 1.02 | 27 | 4.0 | 10.5 |
| Example 3 | TDI | 0.50 | 60–70°/2.25 | 0.35 | | 17 | 4.0 | 10.0 |
| Example 4 | TDI | 0.50 | 60–100°/4.0 | 0.36 | 1.03 | 19 | 4.0 | 12.5 |
| Example 5 | TDI | 0.60 | 60–100°/5.75 | 0.43 | | 20 | — | 8.0 |
| Example 6 | TDI | 0.75 | 60–100°/5.75 | 0.48 | | 20 | — | 9.5 |
| Example 7 | HMDI | 0.50 | 60–70°/3.5 | 0.31 | | 16 | 5.5 | 8.5 |
| Example 8 | MDI | 0.50 | 60–70°/2.5 | 0.27 | | 21 | 5.5 | 10.0 |
| Comparative Example 1 | Phenylisocyanate | 0.50 | 60–70°/2.5 | — | | 17 | 3.5 | 28.5 |
| Pentaerythritol Ester of a Hydrolyzed Phosphosulfurized Polyisobutene | — | — | — | — | 1.04 | 29 | 4.0 4.5 5.0 | 21.0 18.5 21.5 |

[1]Bench VC Tests were conducted in a formulation which contained besides the indicated weight percent of dispersant, a detergent, antioxidants, a viscosity index improver, a corrosion and wear inhibitor, a rust inhibitor, a pour depressant and an antifoamant.

In all instances (except for Comparative Example 1) the polyurethane dispersant exhibited a substantially superior dispersancy than its corresponding pentaerythritol ester, i.e., the precursor before reaction with the diisocyanate.

As can be seen from the data above, the polyurethane dispersants of the present invention are effective particularly at levels of 6.0 weight percent and higher as detergents/dispersants for lubricating oil compositions. Some of the polyurethane dispersants of the invention are effective at even lower concentrations, notably, the 3. A polyurethane polymer according to claim 2 having a molecular weight between 2,500 and 8,000.

4. A polyurethane polymer according to claim 1 having between 1 and 4 diisocyanate units incorporated into said polymer.

5. A polyurethane polymer according to claim 1 prepared by reaction of diisocyanate with said polyol, the mole ratio of isocyanate groups to hydroxyl groups being in the range of 0.1 to 9:1.

6. A polyurethane polymer according to claim 5 wherein the mole ratio of isocyanate to hydroxyl groups is in the range of 0.25 to 0.75:1.

7. A polyurethane polymer according to claim 5 prepared by reaction of said diisocyanate with said polyol at a temperature of 0° to 200° C.

8. A polyurethane polymer according to claim 7 wherein said polyurethane is prepared by reaction of said diisocyanate with said polyol at a temperature of 50° to 100° C.

9. A polyurethane polymer according to claim 7 wherein said diisocyanate reacts with said polyol at a pressure of 5 Torr to 5 atmospheres.

10. A polyurethane polymer according to claim 9 wherein the reaction of the diisocyanate with the polyol is effected for a period of between 0.5 and 6 hours.

11. A polyurethane polymer according to claim 10 prepared by reaction of the diisocyanate with the polyol in the presence of a catalyst.

12. A polyurethane polymer according to claim 2 wherein said polyol has the formula

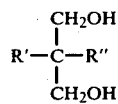

wherein R' and R" are selected from the group consisting of alkylol and alkyl of from 1 to 20 carbon atoms.

13. A polyurethane polymer according to claim 1 which is the reaction product of said diisocyanate with a polyol derivative prepared by the steps comprising:
A. contacting an aliphatic polyolefin of an average molecular weight between about 250 and 50,000 with P$_2$S$_5$ in the presence of between about 0.1 and 5 weight percent sulfur at a temperature of between about 100° and 320° C., P$_2$S$_5$ comprising between about 5 and 40 weight percent of the reaction mixture;
B. contacting the resultant polyolefin-P$_2$S$_5$ reaction product with steam at a temperature of between about 100° and 260° C. utilizing at least about a mole ratio excess of steam in respect to said polyolefin-P$_2$S$_5$ reaction product;
C. removing inorganic phosphorus acid from the steam treated polyolefin-P$_2$S$_5$ reaction product;
D. contacting the inorganic acid-free, steam hydrolyzed polyolefin-P$_2$S$_5$ reaction product with a polyol of the formula

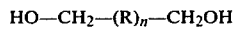

wherein
n=0 or 1 and
R is a saturated or unsaturated substituted or unsubstituted alkylene group of 1 to 12 carbon atoms
at a temperature between about 180° and 220° C. in a mole ratio of said inorganic phosphorus acid free, steam hydrolyzed P$_2$S$_5$-polyolefin reaction product to said polyol of between about 1:0.33 to 2.

14. A polyurethane polymer according to claim 13 wherein the polyolefin-P$_2$S$_5$ reaction mixture of step A, prior to contact with steam in said step B, is diluted with a mineral oil of an SUS viscosity between about 50 and 1,000 to form a diluted polyolefin-P$_2$S$_5$ reaction mixture having a mineral lubricating oil content of between about 25 and 75 weight percent and contacting the resulting lubricating oil solution in accordance with said B, C, and D steps.

15. A polyurethane polymer according to claim 13 wherein said polyol has the formula

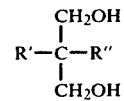

wherein R' and R" are selected from the group consisting of alkylol and alkyl of from 1 to 20 carbon atoms.

16. A polyurethane polymer according to claim 15 wherein said polyolefin is polyisobutene of a molecular weight of about 1,300 and said polyol is trimethylolpropane.

17. A polyurethane polymer according to claim 15 wherein said polyolefin is a polyisobutene of an average molecular weight of about 1,300 and said polyol is pentaerythritol.

18. A polyurethane polymer according to claim 15 wherein said polyolefin is polyisobutene of an average molecular weight of about 1,300 and said polyol is neopentyl glycol.

19. A lubricating oil composition comprising a major amount of lubricant oil and an effective detergent-dispersant amount of a polyurethane of claim 1, said lubricating oil selected from the group consisting of mineral lubricating oil, synthetic ester lubricating oil, synthetic ether lubricating oil, and synthetic hydrocarbon lubricating oil.

20. A lubricating oil composition comprising a major amount of lubricant oil and an effective detergent-dispersant amount of a polyurethane of claim 2, said lubricating oil selected from the group consisting of mineral lubricating oil, synthetic ester lubricating oil, synthetic ether lubricating oil, and synthetic hydrocarbon lubricating oil.

21. A lubricating oil composition comprising a major amount of lubricant oil and an effective detergent-dispersant amount of a polyurethane of claim 12, said lubricating oil selected from the group consisting of mineral lubricating oil, synthetic ester lubricating oil, synthetic ether lubricating oil, and synthetic hydrocarbon lubricating oil.

22. A lubricating oil composition comprising a major amount of lubricant oil and an effective detergent-dispersant amount of a polyurethane of claim 13, said lubricating oil selected from the group consisting of mineral lubricating oil, synthetic ester lubricating oil, synthetic ether lubricating oil, and synthetic hydrocarbon lubricating oil.

23. A lubricating oil composition comprising a major amount of lubricant oil and an effective detergent-dispersant amount of a polyurethane of claim 14, said lubricating oil selected from the group consisting of mineral lubricating oil, synthetic ester lubricating oil, synthetic ether lubricating oil, and synthetic hydrocarbon lubricating oil.

24. A lubricating oil composition comprising a major amount of lubricant oil and an effective detergent-dispersant amount of a polyurethane of claim 15, said lubricating oil selected from the group consisting of mineral lubricating oil, synthetic ester lubricating oil, synthetic ether lubricating oil, and synthetic hydrocarbon mineral oil.

25. A lubricating oil composition comprising a major amount of lubricant oil and an effective detergent-dispersant amount of a polyurethane of claim 16, said lubricating oil selected from the group consisting of mineral lubricating oil, synthetic ester lubricating oil, synthetic ether lubricating oil, and synthetic hydrocarbon mineral oil.

26. A lubricating oil composition comprising a major amount of lubricant oil and an effective detergent-dispersant amount of a polyurethane of claim 17, said lubricating oil selected from the group consisting of mineral lubricating oil, synthetic ester lubricating oil, synthetic ether lubricating oil, and synthetic hydrocarbon mineral oil.

27. A lubricating oil composition comprising a major amount of lubricant oil and an effective detergent-dispersant amount of a polyurethane of claim 18, said lubricating oil selected from the group consisting of mineral lubricating oil, synthetic ester lubricating oil, synthetic ether lubricating oil, and synthetic hydrocarbon mineral oil.

* * * * *